US011934364B2

(12) United States Patent
Gupta et al.

(10) Patent No.: US 11,934,364 B2
(45) Date of Patent: Mar. 19, 2024

(54) SYSTEM AND METHOD FACILITATING DETERMINATION OF AUTOMOTIVE SIGNAL QUALITY MARKER

(71) Applicant: CEREBRUMX LABS PRIVATE LIMITED, Haryana (IN)

(72) Inventors: Amit Gupta, Haryana (IN); Sandip Ranjhan, Delhi (IN); Sarika Gupta, Haryana (IN)

(73) Assignee: Cerebrumx Labs Private Limited, Haryana (IN)

( * ) Notice: Subject to any disclaimer, the term of this patent is extended or adjusted under 35 U.S.C. 154(b) by 0 days.

(21) Appl. No.: 17/512,640

(22) Filed: Oct. 27, 2021

(65) Prior Publication Data

US 2023/0048139 A1    Feb. 16, 2023

(30) Foreign Application Priority Data

Aug. 11, 2021 (IN) .............................. 202111036433

(51) Int. Cl.
| G06F 16/00 | (2019.01) |
| G06F 16/215 | (2019.01) |
| G06F 16/2457 | (2019.01) |
| G06F 16/248 | (2019.01) |
| G07C 5/00 | (2006.01) |
| G07C 5/08 | (2006.01) |

(52) U.S. Cl.
CPC ........ G06F 16/215 (2019.01); G06F 16/2457 (2019.01); G06F 16/248 (2019.01); G07C 5/008 (2013.01); G07C 5/0841 (2013.01)

(58) Field of Classification Search
CPC .. G06F 16/2457; G06F 16/215; G06F 16/248; G07C 5/008; G07C 5/0841
USPC .................................................. 707/600–899
See application file for complete search history.

(56) References Cited

U.S. PATENT DOCUMENTS

| 10,278,039 | B1 * | 4/2019 | Matus ..................... G01C 21/20 |
| 2017/0103101 | A1 * | 4/2017 | Mason ................ G06F 16/2365 |
| 2018/0025317 | A1 * | 1/2018 | Dominguez ....... G06Q 10/0832 |
|  |  |  | 705/332 |
| 2018/0077538 | A1 * | 3/2018 | Matus .................. G08B 25/016 |
| 2018/0174485 | A1 * | 6/2018 | Stankoulov .......... G09B 19/167 |
| 2019/0155291 | A1 * | 5/2019 | Heit ....................... B60W 30/00 |
| 2019/0265712 | A1 * | 8/2019 | Satzoda ............... G05D 1/0246 |

(Continued)

*Primary Examiner* — Michelle N Owyang
(74) *Attorney, Agent, or Firm* — Matthew D. Thayne; Thayne and Davis LLC

(57) ABSTRACT

The present invention provides a robust and effective solution to an entity or an organization by allowing to visualize the flow of automotive data signals from a source system to a sink system with different metric signals at each step and creating a mechanism for creating automotive signal quality marker (ASQM) for high quality automotive data signals by determining high value data parameters, inter-parameter correlation, data quality variation with trip duration, and frequency of data collection/distribution across datasets. The quality criterion thus developed is applied to data generated from a plurality of data sources. The ASQM may be calculated by converting the developed automotive data signals quality criterion into a numeric value on a specified scale. It can be used by all stakeholders in the value chain for consistent measurement of automotive data signals quality.

17 Claims, 6 Drawing Sheets

(56) References Cited

U.S. PATENT DOCUMENTS

2019/0303693 A1\* 10/2019 Watanabe ........ G08G 1/096791
2020/0242858 A1\* 7/2020 Meroux ................. G07C 5/085

\* cited by examiner

SYSTEM AND METHOD FACILITATING DETERMINATION OF AUTOMOTIVE SIGNAL QUALITY MARKER

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today smart vehicles generate large amount of data every second, which gets collected in the vehicle manufacturer's cloud. This data, based on the data utilization contract with end-users, is further consumed by the data consumers to derive useful insights pertaining to vehicle health, driver driving patterns, fleet tracking, audience measurement, consumer buying patterns, city planning, etc. These insights and inferences are directly dependent on the composition, quality and the frequency at which the data is collected, aggregated and shared. Typically, there can be 500+ data signals that are generated from connected vehicle. Automotive data signals collected from different original equipment manufacturers (OEM), different trim within same OEMs and same make or model in different countries, varies significantly. Hence, there is a difference in the data provided by each source pertaining to number of collected signals, format and frequency of distributed data. Based on the industry and associated use cases, data consumers are interested to consume specific data signals at a particular frequency. Based on the source of data in vehicle, the data signals can be broadly be telematics, body control, advanced driver-assistance system (ADAS), diagnostics, in-vehicle infotainment. Different categories of data have different value. A certain set of data signals can be used across industries and use cases, which makes them extremely valuable for the enterprises engaged in the business of data collection and distribution. Presence of these high value signals made available at a configurable frequency is an important factor in determining the value of data.

However, as of today there is no standardization or common taxonomy around the signals that shall be generated by connected car and at what frequency they shall be generated. The type of signals present in the data received is as important as the volume of data shared by the vehicle manufacturer. A quantitative mechanism to derive the quality of vehicle data along with the supported frequency is an important step towards seamless and transparent data value prediction. Currently, there is no standard set for high value signals in the automotive segment and the knowledge pertaining to these signals is scattered across the industry. Additionally, to derive useful insights of interest from the data, data consumers not only need specific data signals but shall need sufficient and balanced data samples at specific frequency, which are representative of large data population. Overall, quality of automotive data signals is a factor of presence of high value data signals, frequency of data samples and number of data samples.

There is therefore, a need in the art to provide a system and a method that can overcome the shortcomings of the existing prior art and standardize this quality measurement with a quality metric that can enable everyone across data chain to have a transparent view of data value.

SUMMARY

An example embodiment of the present disclosure pertains to an automotive signal quality marker system. The proposed system may include a plurality of distributed source systems associated with a plurality of automotive. The system may also include a plurality of distributed storage systems to store a set of data packets pertaining to automotive data signals from the plurality of distributed source systems associated with the plurality of automotive data sources a processor; a data quality module coupled to the processor. The data quality module may cause the system to: receive the set of data packets from the distributed storage systems, wherein the set of data packets may be received at a specific frequency and in specific quantity/numbers; extract a set of attributes from the set of data packets received pertaining to a set of predefined parameters; correlate and perform a predefined set of instructions on the set of attributes extracted to obtain a set of high value data parameters; and determine an automotive signal quality marker (ASQM) based on the set of high value data parameters. The ASQM may enable visualization of the automotive data signals from the distributed source system to a sink system with different metric parameters.

Another example embodiment of the present disclosure pertains to a method facilitating estimation of automotive signal quality marker. The method may include the step of receiving by a processor, a set of data packets from a plurality of distributed storage systems associated with the automotive data sources. In an example embodiment, the set of data packets may be received at a specific frequency and in specific quantity/numbers. The method may further include the step of extracting by a data quality module coupled to the processor, a set of attributes from the set of data packets received pertaining to a set of predefined parameters; and then the method may include the step of correlating and performing a predefined set of instructions on the set of attributes extracted to obtain a set of high value data parameters. The method may further include the step of determining an automotive signal quality marker (ASQM) based on the set of high value data parameters, wherein the ASQM enables visualization of the automotive data signals from the distributed source system to a sink system with different metric parameters.

The present disclosure further pertains to a non-transitory computer readable medium comprising machine executable instructions that are executable by a processor. Upon such execution of the machine executable instructions, the processor may cause the non transitory computer readable medium to: receive a set of data packets from a plurality of distributed storage systems associated with the automotive data sources, wherein the set of data packets is received at a specific frequency and in specific quantity/numbers; extract a set of attributes from the set of data packets received pertaining to a set of predefined parameters; correlate and perform a predefined set of instructions on the set of attributes extracted to obtain a set of high value data parameters; and determine an automotive signal quality marker (ASQM) based on the set of high value data parameters, wherein the ASQM may enable visualization of the automotive data signals from the distributed source system to a sink system with different metric parameters.

BRIEF DESCRIPTION OF DRAWINGS

Features of the present disclosure are illustrated by way of examples shown in the following figures. In the following figures, like numerals indicate like elements, in which.

The foregoing shall be more apparent from the following more detailed description of the invention.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

1. Overview

The present disclosure describes systems and methods for assessing Automotive Signal Quality Marker. The term "Automotive Signal Quality Marker (ASQM)" is a universal marker to measure quality of automotive signals generated from a plurality of data sources. Automotive signals quality is an outcome of a plurality of factors ranging from critical data signals to the cost of collecting and distributing that data (sampling and sharing frequency).

The present invention provides a robust and effective solution to an entity or an organization by allowing to visualize the flow of automotive data signals from a source system to a sink system with different metric parameters at each step and creating a mechanism for creating key criteria for high quality automotive data signals by determining high value data parameters, inter-parameter correlation, data quality variation with trip duration, and frequency of data collection/distribution across datasets. The quality criterion thus developed is applied to data generated from a plurality of data sources. The ASQM may be calculated by converting the developed automotive data signals quality criterion into a numeric value on a specified scale. It can be used by all stakeholders in the value chain for consistent measurement of automotive data signals quality.

2. System Description

Figure 1:
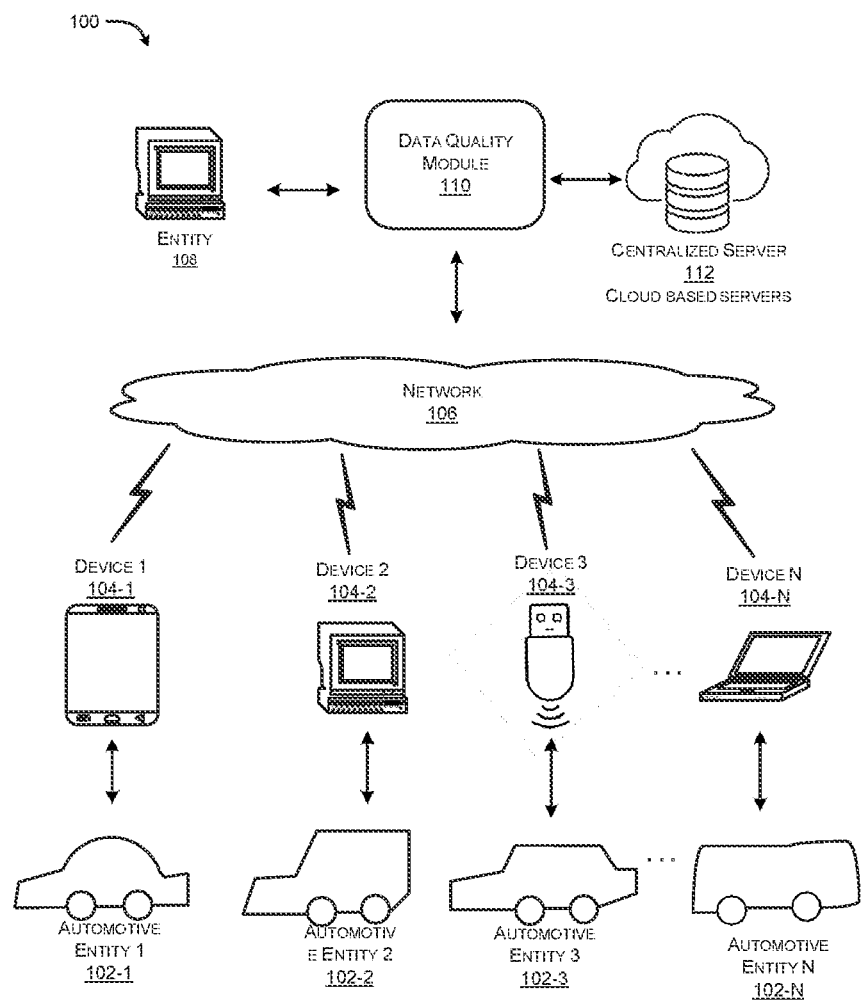
FIG. 1 illustrates a network architecture in which or with which data quality module of the present disclosure can be implemented, according to an example embodiment of the present disclosure.

FIG. 1 illustrates an automotive signal quality marker system (100), according to an example embodiment of the present disclosure. In an example embodiment, the automotive signal quality marker system (100), hereinafter referred to as system (100), amongst other components, includes a data quality module (110) (also referred to as data quality module 110 hereinafter) for facilitating estimation of a set of data packets from one or more first computing devices (104) associated with plurality of automotive (102-1, 102, . . . 102-N) (collectively referred to as automotive (102) and individually referred to as automotive (102) to be stored in one or more second computing devices (108) associated with an entity. In an embodiment, the set of data packets may correspond to automotive data signals from the plurality of automotive (102) but not limited to it and may include automotive data signals corresponding to telematics, body control, ADAS, diagnostics, in-vehicle infotainment and the like.

In an example embodiment, the one or more first computing devices (104) may include a plurality of distributed source systems. And the one or more second computing devices (108) may include a plurality of distributed storage systems.

The data quality module (110) may be coupled to a centralized server (112). The data quality module (110) may also be operatively coupled to one or more first computing devices (104) and one or more second computing devices (108) through a network (106).

In an embodiment, the data quality module (110) may receive the set of data packets from the first computing devices (104) associated with the plurality of automotive (102). The set of data packets may be received at a specific frequency and in specific quantity/numbers. The data quality module (110) may be further configured to extract a set of attributes pertaining to personalized data and also extract a second set of attributes pertaining to aggregated data from the set of data packets received based on a set of predefined parameters that may include 1) data type (DTQ) 2) key data features, 3) data mode (DMQ), 4) data frequency (DFQ), 5) data validity (DVQ), and 6) data skewness (DSQ) but not limited to the like. The set of predefined parameters may include standardizing each individual parameter (also referred to as factors herein) through rescaling of each individual quality markers and applying weighted values to each individual parameter. The data quality module (110) may be further configured to calculate ASQM that may include category quality marker (CQI), data mode quality marker (MQI), frequency quality marker (FQI), validity quality marker (VQI), data skewness quality marker (SQI) but not limited to the like. Furthermore, an overall ASQM may be calculated by the data quality module (110) by summing the individual quality indices and multiplying the summation by the determined data type quality (DTQ) value. For example, the ASQM may be classified according to a predefined set of instructions such as Poor, Average, Good, and Excellent and the like based on ASQM score on a scale of 0 to 40 but not limited to it.

In an example embodiment, the data quality module (110) may be configured to update the database every time and an end-to-end data completeness check for each of the data pipeline can be enabled and visualized by the data quality module (110) that may send the processed set of data packets to the second computing device (108).

In an example embodiment, an ASQM criteria may be based on the set of data packets received. In a way of example and not as a limitation, the personalized data may contain data pertaining to user identity of the vehicle such as VIN, email, telephone and the like. In the aggregated data no data signal that can lead to identify of end-user is shared. The personalized data may be much more useful in generating insights for specific consumer and driver behavior and can help support a number of use cases such as insurance, fleet but not limited to the like.

The set of data packets may be categorized into the personalized and the aggregated data but not limited to it.

In an example embodiment, key data features may be the automotive data signals, which may define the overall trip, vehicle health and driver behavior. These data signals may be used to generate insights at a vehicle level or aggregated across a set of vehicles. The signals may be divided into different feature categories and assigned priority based on the importance and usage of the signals. For example, the key features of automotive data signals may include but not limited to:

Trip Signals: Odometer, Time, distance, Lat, Long, heading, Altitude, GPS Signals, Fuel Status, Occupancy Vehicle Profile: VIN, Trim, Fuel, Type, Model, Year of Manufacture, Country of Origin Driver Profile: Age, Gender Driving Pattern: Harsh Braking/Acceleration/Cornering, Distracted Driving, Night Driving, Overspeeding and the like.

Vehicle Health: Odometer, Battery health, Brake health, Tire Health, Fuel Efficiency, Engine health, Vehicle Fluid levels, ECU Status, Service status, Transmission status Safety Data: Airbag status, ABS, Seat belt status, Door status Lane Departure Warning, Blind turns, Forward Collision warning Media Data: Media Source, Radio Station/Frequency, app usage, audio metadata Critical Events: FNOL, Impact Events, Vehicle breakdown, and the like.

In an example embodiment, data mode is the mode in which signals may be collected and shared. At least three data collection modes but not limited to it may be supported real-time, batch and historical. In real-time mode, signals may be collected and shared in real-time with a latency of 30-120 sec but not limited to it (except in crash), while the trip is active. In batch mode, signals may be collected in real-time but shared as batch files much after the trip is over. The real-time mode may be useful for supporting industry use cases where real-time tracking of the trip is required active trip tracking and urgent roadside help. The cost of supporting the real-time data mode may be 3× times higher than the batch mode due to data bandwidth requirements and real-time platform integration. While the real-time and batch data may be shared on a regular basis, historical data is signal data pertaining to past trips and may be shared on request.

In an example embodiment, data frequency is dependent on data sampling, aggregation and sharing rate. The data sampling rate is the rate at which individual automotive sensors are sampled in the vehicle. The data aggregation rate is the rate at which signal data is aggregated and shared from the vehicle to cloud. This rate determines the lag in reporting the event vs. the time of actual event occurrence. The more the data aggregation rate, the slower will be real-time data collection, impacting critical decisions and corrective actions. The data sharing rate is the rate at which the data is shared with the external partners, outside of the vehicle manufacturer network. This drives the latency between actual event occurrence in the car vs. reporting of event to external partners. Higher data sharing rate impacts the use cases that need critical response times. Each of the above data frequency parameter is important and impacts both the cost (due to additional cost of network, device and cloud resources) as well as value of data.

In an example embodiment, data validity may be used to determine validity of actual signal values and the factors that define the validity of data may include signal boundary checks to remove out of bound values, signal correlation and dependency. If signal correlation suggests deviation from normally correlated signals, data validity shall be adjusted. For example, speed and fuel efficiency is correlated and the data must show the same trends. Similarly, if a set of signals is dependent on another set, both set of signals have to be present in the dataset to give meaningful information. Another example may be GPS location signal values cannot be trusted to be accurate, if GPS accuracy signal is not available in the same dataset. In yet another example, speed and fuel efficiency are correlated and the data must show the same trends.

In an example embodiment, data skewness may be used to determine if the signal data received is balanced and has enough data to draw inferences. A balanced data set value is more valuable than a skewed dataset. The factors that determine if the dataset is balanced may include but not limited to:

Trip duration: If all the trips are too short, then the data received may not be a good representative of the overall dataset.

Vehicle Types: Aggregated datasets must contain data covering possible vehicle models and Trims to draw meaningful inferences. For e.g. a data set containing media data can be used for audience measurement, if it represents different population segments of the area.

Driver Profile: Aggregated dataset containing trip data with an even spread of driver age groups and gender provides better correlation between drive profile and driver behavior.

Location: A dataset covering multiple locations in the area much more valuable than a dataset, which contains trips only in a certain area.

In an example embodiment, the one or more first computing devices (104), the one or more second computing devices (108) may communicate with the data quality module (110) via set of executable instructions residing on any operating system, including but not limited to, Android™, iOS™, Kai OS™, Linux, Android Auto, QNX and the like. In an embodiment, to one or more first computing devices (104), and the one or more second computing devices (108) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the one or more second computing devices (108) may not be restricted to the mentioned devices and various other devices may be used. A smart computing device may be one of the appropriate systems for storing data and other private/sensitive information.

In an example embodiment, the data quality module (110) or the centralized server (112) may include one or more processors coupled with a memory, wherein the memory may store instructions which when executed by the one or more processors may cause the system to access content stored in a network.

In another example embodiment, the centralized server (112) may include or comprise, by way of example but not limitation, one or more of: a cloud based server, a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
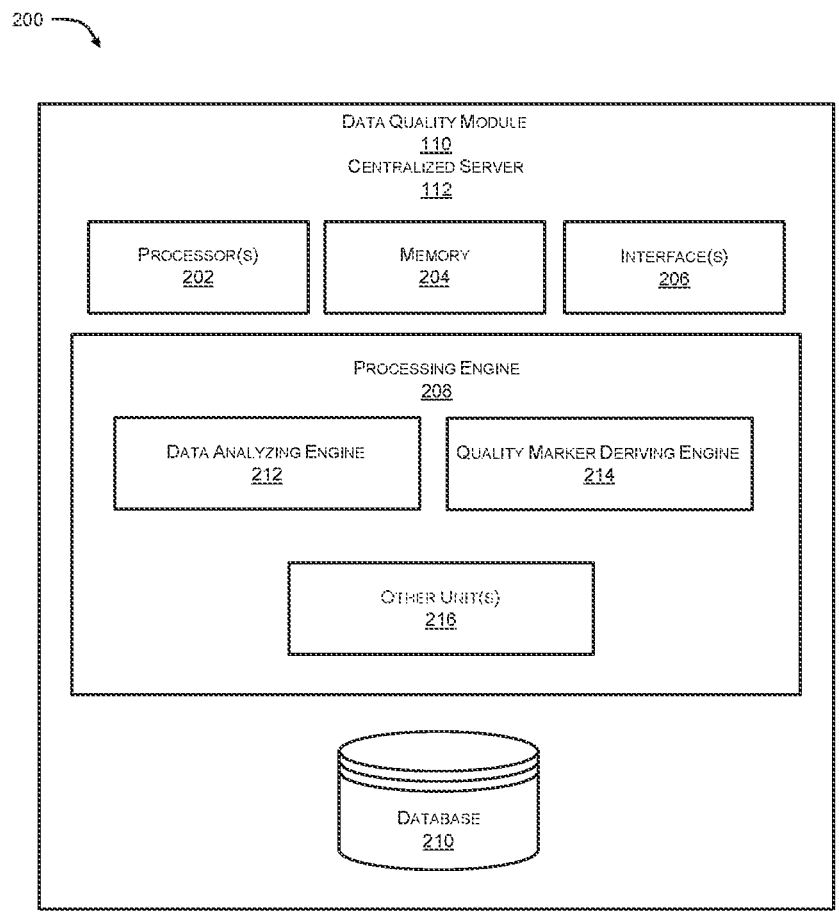
FIG. 2 illustrates a representation of data quality module/ centralized server for accessing content stored in a network, according to an example embodiment of the present disclosure.

FIG. 2 with reference to FIG. 1, illustrates an example representation of data quality module (110)/centralized server (112) for facilitating real time automotive data feeds, according to an example embodiment of the present disclosure. In an aspect, the data quality module (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the data quality module (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an example embodiment, the data quality module (110)/centralized server (112) may include an interface(s) 204. The interface(s) 204 may comprise a variety of interfaces, for example, interfaces for data input and output devices, referred to as I/O devices, storage devices, and the like. The interface(s) 204 may facilitate communication of the data quality module (110). The interface(s) 204 may also provide a communication pathway for one or more components of the data quality module (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the data quality module (110)/centralized server (112) may comprise the machine-readable storage medium storing the instructions and the processing resource to execute the instructions, or the machine-readable storage medium may be separate but accessible to the data quality module (110)/centralized server (112) and the processing resource. In other examples, the processing engine(s) (208) may be implemented by electronic circuitry.

The processing engine (208) may include one or more engines selected from any of a data analyzing engine (212), a quality marker deriving engine (214), and other engines (216).

The data analyzing engine (212) may be responsible for receiving specific automotive data signals at a specific frequency and in specific quantity/numbers. The quality marker deriving engine (214) may be configured to calculate/define predefined quality factors/parameters, including 1) data type (DTQ), 2) key data features, 3) data mode (DMQ), 4) data frequency (DFQ), 5) data validity (DVQ), and 6) data skewness (DSQ) but not limited to the like. The ML engine (214) may further be configured to standardize individual factors/parameters through 1) rescaling of the individual quality markers and applying weighted values to the individual parameters while also calculating quality indices, including 1) category quality marker (CQM), 2) data mode quality marker (MQM), 3) frequency quality marker (FQM), 4) validity quality marker (VQM), and 5) data skewness quality marker (SQM) but not limited to the like. Furthermore, the ML engine (214) may calculate overall ASQM by summing all individual quality markers and multiplying the summation by the determined data type quality (DTQ) value and then classify ASQM as Poor, Average, Good, and Excellent based on ASQM score on a scale of 0 to 40 but not limited to it.

Figure 3:
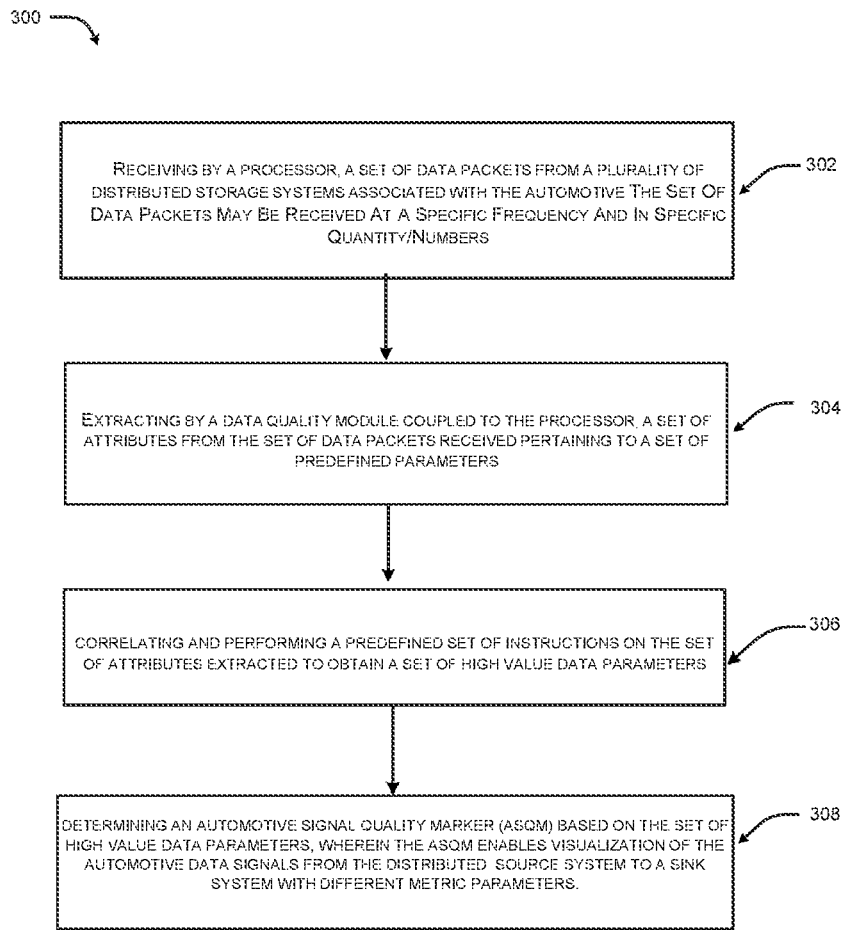
FIG. 3 illustrates a representation of a proposed method associated with the data quality module, according to an example embodiment of the present disclosure.

FIG. 3 illustrates an example representation of a proposed method associated with the data quality module according to an example embodiment of the present disclosure. According to an aspect, the method (300) for creating an Automotive data signals Quality Marker (ASQM) to measure the quality of automotive data signals generated from a plurality of data sources may include the step 302 of receiving by a processor, a set of data packets from a plurality of distributed storage systems associated with the automotive data sources. In an example embodiment, the set of data packets may be received at a specific frequency and in specific quantity/numbers. The method may further include at 304 the step of extracting by a data quality module coupled to the processor, a set of attributes from the set of data packets received pertaining to a set of predefined parameters; and then the method may include at 306 the step of correlating and performing a predefined set of instructions on the set of attributes extracted to obtain a set of high value data parameters. The method may further include at 308 the step of determining an automotive signal quality marker (ASQM) based on the set of high value data parameters, wherein the ASQM enables visualization of the automotive data signals from the distributed source system to a sink system with different metric parameters.

Figure 4:
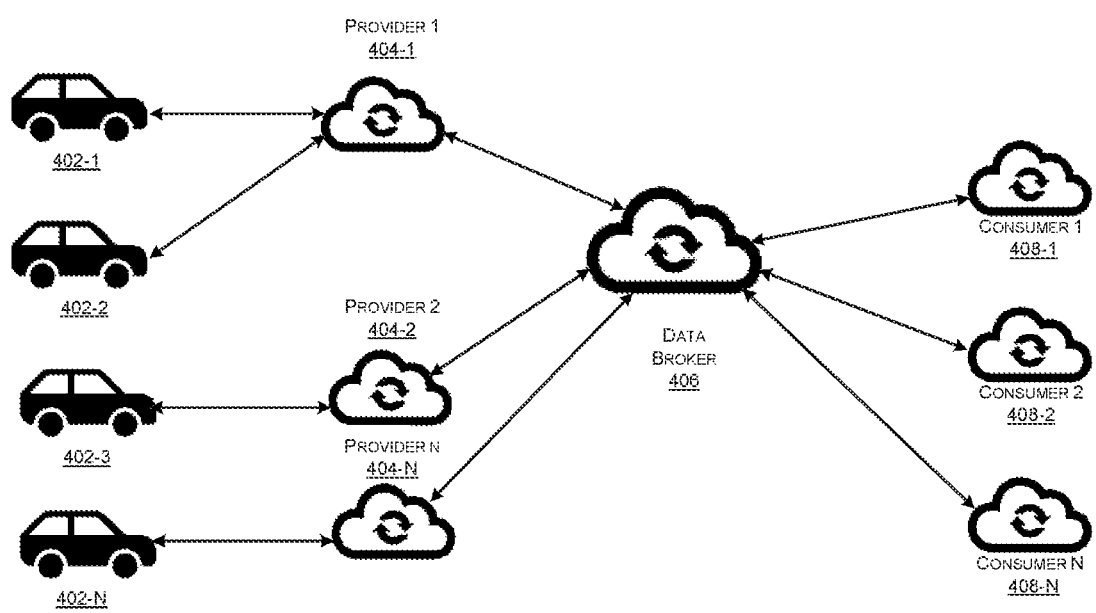
FIG. 4 illustrates a representation of an overall system configuration, according to an example embodiment of the present disclosure.

FIG. 4 illustrates an example representation of an overall system configuration, according to an example embodiment of the present disclosure. As illustrated, the overall system may include automotive data signals being collected to and from a plurality of vehicles (402-1, 402-2, . . . 402-N) from a plurality of providers (404-1, 404-2, . . . 404-N) communicatively coupled to a data broker (406) and a plurality of consumers (408-1, 408-2 . . . 408-N).

Figure 5:
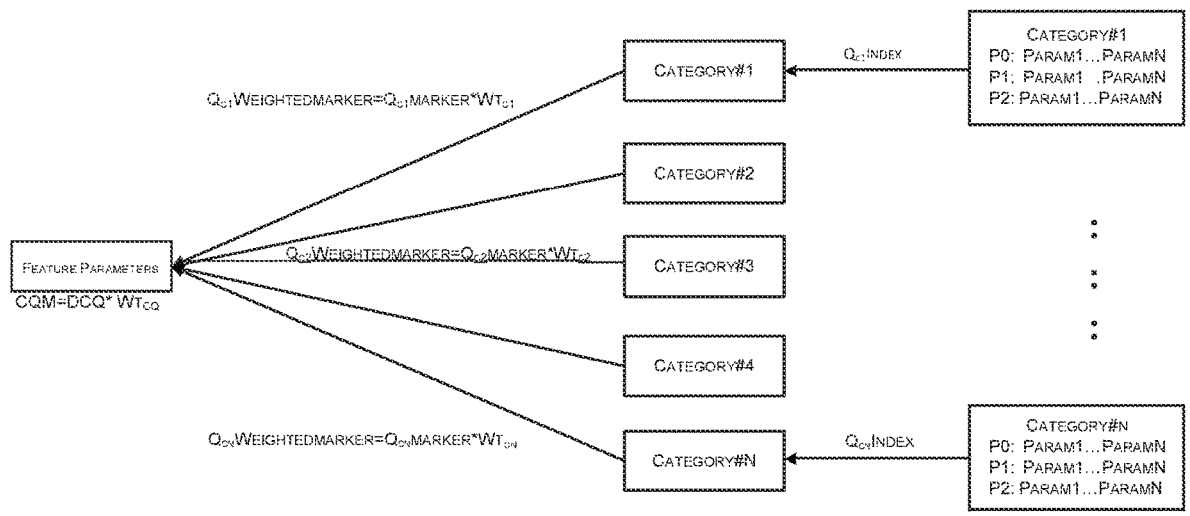
FIG. 5 illustrates a representation of a block diagram highlighting application of quality criteria according to an example embodiment of the present disclosure.

FIG. 5 illustrates an example representation of a block diagram highlighting application of quality criteria according to an example embodiment of the present disclosure.

In an example embodiment a nested weight-based mechanism but not limited to it may be used to apply the quality criteria and derive the overall quality marker. In an example embodiment, configurable weights may be assigned to each criterion and thresholds combined with the weights may determine the quality marker value.

In an example embodiment, the data type may be categorized as aggregated or personalized based on the information available in a trip data to identify a user using the following rules. The trip data may be categorized as "Personalized", if trip data contains VIN, User Name, Address, Email-Id and the like. Data from OEM may have both types of data Personalized as well as Aggregated. Hence, data type quality (DTQ) may be a mix of both and is calculated as follows $$100\% \text{ Personalized Data} \rightarrow \text{DTQ} = \text{Very High Value} \quad (4)$$

$$50\% < \text{Personalized Data} < 80\% \rightarrow \text{DTQ} = \text{High Value} \quad (3)$$

$$10\% < \text{Personalized Data} < 50\% \rightarrow \text{DTQ} = \text{Medium Value} \quad (2)$$

$$100\% \text{ Aggregated Data} \rightarrow \text{DTQ} = \text{Low Value} \quad (1)$$

In a way of example and not as limitation, key data features may include all data signals categorized into feature categories based on the type of signals. Within each category, signals are further divided priority-based groups such as P0-High: This group includes the mandatory signals required to support every use case.

P1-Medium: This group includes the signals, required to support specific use cases.

P2-Low: This group includes optional signals.

Each category has a defined weight attached to it based on its relevance and importance. Quality pre-marker is calculated for each category based on the presence of P0, P1, and P2 signals within that category as below $Q_i$Marker=Num of $P_i$Params, where i is in the range (0, 2) Total $P_i$Params, and Qi is quality pre-marker for Total PiParams signal of priority Pi $Q_{cj}$Marker=$\Sigma Q_i$Marker, where i is in the range (0, 2) and j represents category in the range (0 . . . n) Qcj is Quality pre-marker for category j $Q_{cj}$WeightedMarker=$Q_{cj}$Marker*$Wt_{cj}$, where $Wt_{cj}$ (1 . . . 10) is the weight assigned category of signals with j in the range (0 . . . n)

DCQ=$\Sigma Q_{cj}$WeightedMarker, where j is in the range (0, n), n is the number of parameter categories In an example embodiment, quality marker component for a data mode may be calculated as below $$\text{Real-time mode} \rightarrow \text{DMQ} = \text{Very High} \quad (4)$$

$$\text{Mixed mode} \rightarrow \text{DMQ} = \text{High} \quad (3)$$

$$\text{Batch mode} \rightarrow \text{DMQ} = \text{Medium} \quad (2)$$

$$\text{Historical mode} \rightarrow \text{DMQ} = \text{Low} \quad (1)$$

Data Frequency: quality marker component for data frequency shall be calculated as below For batch and historical data, since the frequency doesn't impact data quality, data frequency quality is set to 4 (High) or DFQ=4

For realtime data, the quality marker for data frequency component is calculated by categorizing the signal data based on data sharing frequency (FQ, data frequency quality marker).

$$\text{DF} < 30 \text{ sec} \rightarrow \text{DFQ} = \text{High} \quad (4)$$

$$\text{sec} < \text{DF} < 300 \rightarrow \text{DFQ} = \text{Medium} \quad (3)$$

$$300 \text{ sec} < \text{DF} < 500 \text{ sec} \rightarrow \text{DFQ} = \text{Low} \quad (2)$$

$$\text{DF} > 500 \text{ sec} \rightarrow \text{DFQ} = \text{Very Low} \quad (1)$$

In an example embodiment, the quality marker component for data validity shall be calculated based on the validity and useful data percentage (VQ, validity quality marker)

$$\text{VAL} < 10\% \text{ invalid data} \rightarrow \text{DVQ} = \text{High} \quad (4)$$

$$10\% < \text{VAL} < 30\% \rightarrow \text{DVQ} = \text{Medium} \quad (3)$$

$$30\% < \text{VAL} < 50\% \rightarrow \text{DVQ} = \text{Low} \quad (2)$$

$$\text{VAL} > 50\% \rightarrow \text{DVQ} = \text{Very Low} \quad (1)$$

In an example embodiment, the quality marker component for data skewness shall be calculated based on overall trip duration, location skewness, vehicle types and is converted to DQ (data skewness quality) as follows $$\text{DS} < 30\% \rightarrow \text{DSQ} = \text{High} \quad (4)$$

$$30\% < \text{DS} < 50\% \rightarrow \text{DSQ} = \text{Medium} \quad (3)$$

$$50\% < \text{DS} < 80\% \rightarrow \text{DSQ} = \text{Low} \quad (2)$$

$$80\% < \text{DS} \rightarrow \text{DSQ} = \text{Very Low} \quad (1)$$

In an example embodiment, the overall Automotive data signals quality marker (ASQM) may be calculated by applying weighted sum on individual contributing factors by rescaling individual quality marker of each criterion from existing range to standard range (1,10). Calculating weighted values of the quality marker for each criterion that may include:

Calculating data signal category quality marker (CQM)
CQM=DCQ*WtCQ (WtCQ is the weightage given for data mode)

Calculating data mode quality marker (MQM)
MQM=DMQ*WtMQ (WtMQ is the weightage given for data mode)

Calculating data frequency quality marker (FQM)
FQM=DFQ*WtDF (WtDF is the weightage given for data sharing frequency)

Calculating data validity quality marker (VQM)
VQM=DVQ*WtDV (WtDV is the weightage given for data validity Calculating the data skewness quality marker (SQI
SQM=DSQ*WtDS (WtDS is the weightage given for data skewness)

Calculating ASQM in the range (1,40) as follows
Adding all the individual quality indices as these represent the actual data present (CQM+MQM+FQM+VQM+SQM)

Multiplying the result with data type quality
ASQM=(CQM+MQM+FQM+VQM+SQM)*DTQ

In an example embodiment, Automotive data signals Quality Marker (ASQM) may include a range of 0 to 40 with the following interpretation but not limited to:

Upto at least 10 ASQM but not limited to it, implies data quality is "Poor" and cannot be used for any further analysis. Hence, it shall be discarded.

10<ASQM<=20 but not limited to it, implies data quality is "Average" and may be useful for use cases, where need basis sparse data is required 20<ASQM<=30 but not limited to it, implies data quality is "Good" and can be used for generating insights and track necessary events ASQM>30 but not limited to it, implies data quality is "Excellent" and provides the necessary information at a required frequency.

Figure 6:
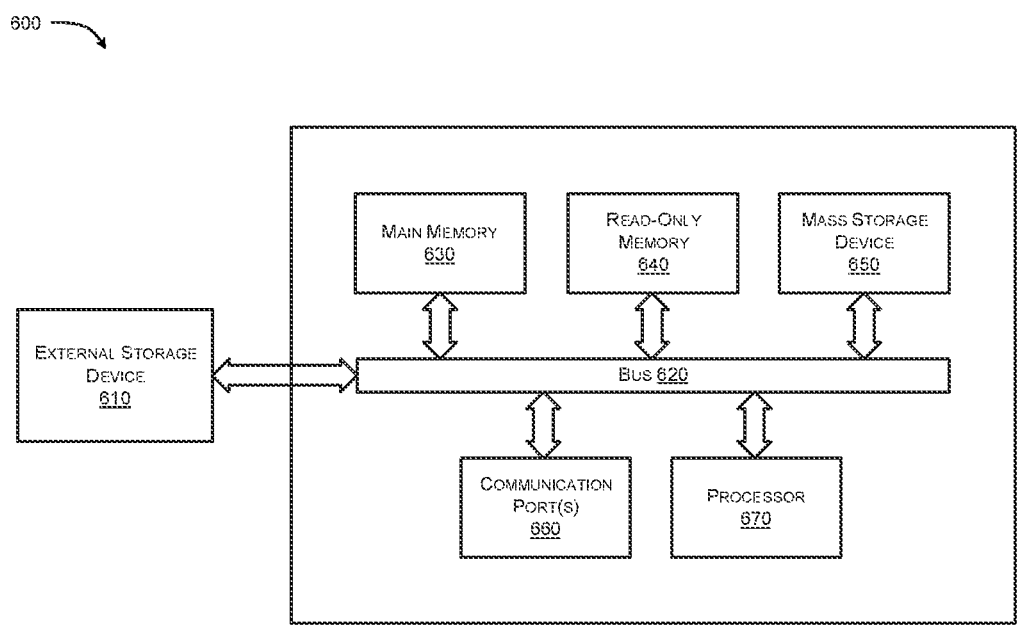
FIG. 6 illustrates a computer system in which or with which embodiments of the present invention can be utilized according to example embodiments of the present disclosure.

FIG. 6 illustrates an example computer system in which or with which embodiments of the present invention can be utilized in accordance with example embodiments of the present disclosure. As shown in FIG. 6, computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on chip processors, cloud-based processors or other future processors. Processor 660 may include various modules associated with embodiments of the present invention. Communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Example mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 6K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couple processor(s) 670 with the other memory, storage and communication blocks. Bus 620 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 660 to software system.

Optionally, operator and administrative interfaces, e.g. a display, keyboard, and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned example computer system limit the scope of the present disclosure.

Thus, the present disclosure provides a unique and inventive solution for the determination of quality of automotive signal data generated by the vehicles and collected by the vehicle manufacturers and standardizing the quality measurement with a quality metric that shall enable everyone across the data chain to have a transparent view of data value. The ASQM as the quality metric may provide a baseline data metric for automotive data collection and distribution. Making signal data quality quantitative has advantages around technical ease of use, adoption and business value while quantification of automotive signal data quality enables easy valuation of use cases. A defined criteria for automotive signal data quality gives a direction to data providers to focus on the monitoring and collection of data points that are relevant for industry use and may help in identifying the important data signals, frequency of collection and data quality before processing the data helps in optimizing the resources (storage, processing and networks), thus giving a cost advantage.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system for estimating quality of automotive data signals, the system comprising:

a plurality of distributed source systems associated with a plurality of automotives, the plurality of distributed source systems being configured to receive the automotive data signals from the plurality of automotives;

a plurality of distributed storage systems to store a set of data packets pertaining to the automotive data signals from the plurality of distributed source systems associated with the plurality of automotives:

a processor; and a data quality module coupled to the processor, the data quality module being operatively coupled to the plurality of distributed source systems and the plurality of distributed storage systems through a network, the data quality module to:

receive the set of data packets from the plurality of distributed storage systems at a specific frequency and in specific quantity/numbers;

calculate a set of predefined parameters pertaining to automotive data signal quality criterion based on the received set of data packets, wherein each of the predefined parameters is assigned with a weight according to relevance of the corresponding parameter;

determine a data type of the received set of data packets by extracting a set of attributes from the received set of data packets based on the set of predefined parameters;

convert each of the set of calculated parameters into a numerical value on a specified scale by rescaling each of the set of calculated parameters into a specified range;

calculate individual quality marker for each of the converted sets of the predefined parameters based on the corresponding assigned weight;

determine an individual automotive signal quality marker (ASQM) based on the calculated individual quality marker for each of the set of the predefined parameters; and calculate an overall ASQM by summing the determined individual signal quality markers for the set of the predefined parameters and multiplying the summation by a predetermined data type quality value;

facilitating optimizing resources associated with storage, processing, and networks based on the calculated overall ASQM by determining whether the automotive data signals need to be discarded or used for deriving insights based the calculated overall ASQM with respect to a predetermined range, generating insights using the automotive data signals based on the overall calculated ASQM when determined that the automotive data signals are used, and identifying frequency of collection and data quality before processing data to optimize the resources based on the overall calculated ASQM.

2. The system as claimed in claim 1, wherein the data quality module further classifies the ASQM calculated on a predefined scale according to a predefined set of instructions.

3. The system as claimed in claim 1, wherein the set of predefined parameters comprises data type (DTQ), key data features (DCQ), data mode (DMQ), data frequency (DFQ), data validity (DVQ), and data skewness (DSQ).

4. The system as claimed in claim 1, wherein the data quality module updates a database every time and checks for an end-to-end data completeness for each data pipeline associated with the set of data packets.

5. The system as claimed in claim 3, wherein the data type (DTQ) comprises personalized data and aggregated data of a user associated with the automotive.

6. The system as claimed in claim 3, wherein the key data features (DCQ) comprises automotive signals pertaining to overall trip signals, vehicle profile, driver profile, driving pattern, safety data, media data, critical events, vehicle health, driver behavior, and a combination thereof.

7. The system as claimed in claim 3, wherein the data mode (DMQ) comprises of signals collected and shared in real-time, batch, historical, or a combination thereof.

8. The system as claimed in claim 3, wherein the data validity (DVQ) comprises signal boundary checks to remove out of bound values, signal correlation, and dependency, and wherein the data skewness (DSQ) comprises balanced data to draw inferences from trip duration, vehicle types, driver profile, location, and a combination thereof.

9. A method for facilitating estimation of quality of automotive data signals, said method comprising:

receiving, by a processor, a set of data packets from a plurality of distributed storage systems associated with a plurality of automotives at a specific frequency and in specific quantity/numbers;

calculating a set of predefined parameters pertaining to automotive data signal quality criterion based on the received set of data packets, wherein each of the predefined parameters is assigned with a weight according to relevance of the corresponding parameter;

determining a data type of the received set of data packets by extracting a set of attributes from the received set of data packets based on the set of predefined parameters;

converting each of the set of calculated parameters into a numerical value on a specified scale by rescaling each of the calculated parameters into a specified range;

calculating individual quality markers for each of the converted sets of the predefined parameters based on the corresponding assigned weight;

determining an individual automotive signal quality marker (ASQM) based on the calculated individual quality marker for each of the set of the predefined parameters; and calculating an overall ASQM by summing the determined individual signal quality markers for the set of the predefined parameters and multiplying the summation by a predetermined data type quality value;

facilitating optimizing resources associated with storage, processing, and networks based on the calculated overall ASQM by determining whether the automotive data signals need to be discarded or used for deriving insights based the calculated overall ASQM with respect to a predetermined range, generating insights using the automotive data signals based on the overall calculated ASQM when determined that the automotive data signals are used, and identifying frequency of collection and data quality before processing data to optimize the resources based on the overall calculated ASQM.

10. The method as claimed in claim 9, wherein the method further comprises:
classifying, by a data quality module, the ASQM calculated on a predefined scale according to a predefined set of instructions.

11. The method as claimed in claim 9, wherein the set of predefined parameters comprises data type (DTQ), key data features (DCQ), data mode (DMQ), data frequency (DFQ), data validity (DVQ), and data skewness (DSQ).

12. The method as claimed in claim 9, wherein the method further comprises:
analyzing, by a data quality module, the set of data packets received through a plurality of processing logic modules.

13. A non-transitory computer readable medium comprising machine executable instructions that are executable by a processor to:

receive a set of data packets from a plurality of distributed storage systems associated with a plurality of automotives at a specific frequency and in specific quantity/numbers;

calculate a set of predefined parameters pertaining to automotive data signal quality criterion based on the received set of data packets, wherein each of the predefined parameters is assigned with a weight according to relevance of the corresponding parameter;

determine a data type of the received set of data packets by extracting a set of attributes from the received set of data packets based on the set of predefined parameters;

convert each of the set of calculated parameters into a numerical value on a specified scale by rescaling each of the set of calculated parameters into a specified range;

calculate individual quality marker for each of the converted sets of the predefined parameters based on the corresponding assigned weight;

determine an individual automotive signal quality marker (ASQM) based on the calculated individual quality marker for each of the set of the predefined parameters; and calculate an overall ASQM by summing the determined individual signal quality markers for the set of the predefined parameters and multiplying the summation by a predetermined data type quality value;

facilitate optimizing resources associated with storage, processing, and networks based on the calculated overall ASQM by determining whether the automotive data signals need to be discarded or used for deriving insights based the calculated overall ASQM with respect to a predetermined range, generating insights using the automotive data signals based on the overall calculated ASQM when determined that the automotive data signals are used, and identifying frequency of collection and data quality before processing data to optimize the resources based on the overall calculated ASQM.

14. The non-transitory computer readable medium as claimed in claim 13, wherein a data quality module further classifies the ASQM calculated on a predefined scale according to a predefined set of instructions.

15. The non-transitory computer readable medium as claimed in claim 13, wherein the set of predefined parameters comprises data type (DTQ), key data features (DCQ), data mode (DMQ), data frequency (DFQ), data validity (DVQ), and data skewness (DSQ).

16. The non-transitory computer readable medium as claimed in claim 15, wherein the data type (DTQ) comprises personalized data and aggregated data of a user associated with the automotive, and wherein the key data features (DCQ) comprises automotive signals pertaining to overall trip signals, vehicle profile, driver profile, driving pattern, safety data, media data, critical events, vehicle health, driver behavior, and a combination thereof.

17. The non-transitory computer readable medium as claimed in claim 15, wherein the data mode (DMQ) comprises of signals collected and shared in real-time, batch, historical, or a combination thereof, wherein the data validity (DVQ) comprises signal boundary checks to remove out of bound values, signal correlation, and dependency, and wherein the data skewness (DSQ) comprises balanced data to draw inferences from trip duration, vehicle types, driver profile, location, and a combination thereof.

* * * * *